United States Patent [19]

Tabb et al.

[11] Patent Number: 4,925,892
[45] Date of Patent: May 15, 1990

[54] FLUOROELASTOMER COMPOSITIONS CONTAINING A TETRAALKYLAMMONIUM HALIDE AND VULCANIZATION ACCELERATOR

[75] Inventors: David L. Tabb; Janet M. Wilson, both of Wilmington, Del.

[73] Assignee: E. I. Du Pont de Nemours and Company, Wilmington, Del.

[21] Appl. No.: 368,086

[22] Filed: Jun. 19, 1989

Related U.S. Application Data

[60] Division of Ser. No. 197,506, Apr. 27, 1988, Pat. No. 4,868,234, which is a continuation-in-part of Ser. No. 43,666, Apr. 28, 1987, abandoned.

[51] Int. Cl.$^5$ .............................................. C08K 5/17
[52] U.S. Cl. .................................... 524/236; 524/546; 525/151
[58] Field of Search ................. 524/236, 546; 525/151

[56] References Cited

U.S. PATENT DOCUMENTS

| | | | |
|---|---|---|---|
| 3,933,732 | 1/1976 | Schmiegel | 260/42.27 |
| 3,997,705 | 12/1976 | Trautvetter | 526/27 |
| 4,446,270 | 5/1984 | Guenthner | 524/433 |
| 4,496,682 | 1/1985 | Schmiegel | 524/545 |

FOREIGN PATENT DOCUMENTS 1356344 6/1974 United Kingdom .

*Primary Examiner*—Joseph L. Schofer
*Assistant Examiner*—Peter D. Mulcahy

[57] ABSTRACT

A fluoroelastomer composition that has enhanced adhesion to metal when cured which comprises:
(a) an elastomeric copolymer of vinylidene fluoride and at least one other fluorinated monomer,
(b) a vulcanization accelerator that is a quaternary phosphonium compound,
(c) a crosslinking agent selected from the group consisting of a bisphenol or a polyhydroxy phenol of the formula:

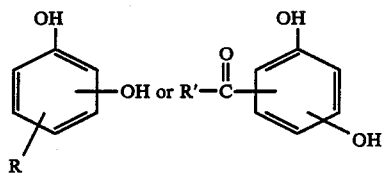

where R is H or an alkyl group or an aryl group and R' is an alkyl group or an aryl group, and
(d) 0.02–0.8 weight percent based on the weight of the elastomeric copolymer of a metal adhesion promoter that is a tetraalkylammonium halide where each alkyl group contains 1–10 carbon atoms and the halide is a chloride, bromide or iodide. When cured in contact with metal the fluoroelastomer composition forms a strong bond with the metal surface.

9 Claims, No Drawings

FLUOROELASTOMER COMPOSITIONS CONTAINING A TETRAALKYLAMMONIUM HALIDE AND VULCANIZATION ACCELERATOR

This is a division of application Ser. No 07/197506, filed Apr. 27, 1988 now U.S. Pat. No. 4,868,234, which is a continuation-in-part of application Ser. No. 07/043,666, filed Apr. 28, 1987, now abandoned.

BACKGROUND OF THE INVENTION

This invention relates to fluoropolymer compositions which contain a tetraalkylammonium halide, certain polyhydroxy crosslinking agents, and quaternary phosphonium compounds that show improved adhesion to metal when cured.

Fluoroelastomer compositions that are copolymers of vinylidene fluoride with other fluorinated monomers, such as hexafluoropropylene and/or tetrafluoroethylene, when cured with a crosslinking agent, such as bisphenol AF (4,4'-hexafluoroisopropylidene diphenol), and an accelerator, such as benzytriphenylphosphonium chloride, have been used for a variety of applications, including shaft seals. A major problem encountered with these fluorelastomers is their lack of developing sufficiently good adhesion to metal when cured. For example, when these fluoroelastomers are used in fabricating shaft seals, there is a need for enhanced adhesion of the elastomers to the metal portion of the shaft seal assembly. To increase the adhesiveness of these elastomers to metal, the fluoroelastomer copolymers described above have been blended with copolymers of vinylidene fluoride and chlorotrifluoroethylene. Unfortunately, the cure rate of the fluoroelastomer is decreased in the presence of relatively small amounts of copolymers of vinylidene fluoride and chlorotrifuloroethylene.

SUMMARY OF THE INVENTION

The present invention is directed to a fluoroelastomer composition that has enhanced adhesion to metal when cured which comprises:

(a) an elastomeric copolymer of vinylidene fluoride and at least one other fluorinated monomer, (b) a vulcanization accelerator that is a quaternary-phosphonium compound, and (c) a crosslinking agent selected from the group consisting of bisphenol, and a polyhydroxy phenol of the formula:

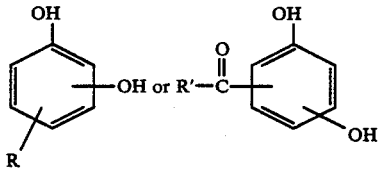

where R is H or an alkyl group or an aryl group, and R' is an alkyl group or an aryl group, and (d) 0.02–0.8 weight percent based on the weight of the elastomeric copolymer of a metal adhesion promoter that is a tetraalkylammonium halide where each alkyl group contains 1–10 carbon atoms and the halide is a chloride, bromide or iodide. The fluoroelastomer compositions are especially useful when cured in contact with metal, for example, to form a shaft seal in which the fluoroelastomer forms a strong bond with the metal surface.

DETAILED DESCRIPTION OF INVENTION

Among the vinylidene fluoride copolymers useful with this invention are copolymers with hexafluoropropylene, chlorotrifuloroethylene, 1-hydropentafluoropropylene, or 2-hydropentafluoropropylene and copolymers of vinylidene fluoride, tetrafluoroethylene and hexafluoropropylene or 1-hydro or 2-hydropentafluoropropylene. "Copolymer" herein means the product of copolymerizing two or more monomers. Especially preferred are vinylidene. fluoride/hexafluoropropylene copolymers in which the monomers are combined in a molar ratio of about 88:12 to 50:50, and terpolymers of the type disclosed in 2,968,649 to Pailthorp et al. The fluoroelastomer can also be any other vinylidene fluoride containing copolymers which can be cured to useful products, for example, copolymers of vinylidene fluoride and hexafluoropropylene or pentafluoropropylene or linear perfluoro alpha olefins with dichlorodifuloroethylene, chlorofluoroethylene, chlorotrifluoroethylene, bromotetrafluorobutene (polymers of bromotetrafluorobutene are shown in Apotheker et al., U.S. Pat. No. 4,214,060), and with fluorinated alkyl vinyl ethers; the latter can be illustrated by copolymers of vinylidene fluoride, hexafluoropropylene and a perfluoroalkyl perfluorovinyl ether.

Useful copolymers of vinylidene fluoride and 1,2,3,3,3-pentafluoropropylene are described in U.S. Pat. No. 3,331,823, and copolymers of these two components with tetrafluoroethylene are described in U.S. Pat. No. 3,335,106.

An essential ingredient of the composition is the vulcanization accelerator that is a quaternary phosphnoium compound. Generally, quaternary phosphonium compounds that can be used as vulcanization accelerators have the formula:

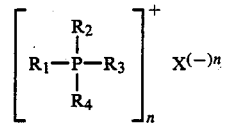

wherein P is phosphorous; $R_1$, $R_2$, $R_3$, and $R_4$ are selected individually from the group: $C_1$-$C_{20}$ alkyl, aryl, aralkyl, alkenyl, and the chlorine, fluorine, bromine, cyano, —OR, and —COOR substituted analogs thereof, R being selected from the group: $C_1$-$C_{20}$ alkyl, aryl, aralkyl, and alkenyl; and X is selected from the group: halide, sulfate, sulfite, bisulfate, bisulfite, carbonate, pentachlorothiophenolate, tetrafluoroborate, hexafluorosilicate, hexafluorophosphate, dimethyl phosphate, and $C_1$-$C_{20}$ alkyl-, aryl-, aralkyl-, and alkenyl-/-carboxylate and dicarboxylate: n is 1 or 2 and equal to the valence of the anion X, and are described and disclosed for this use in Pattison U.S. Pat No. 3,876,654. In the above formula, the quaternary phosphonium vulcanization accelerator can be a 1:1 phosphonium salt (phenolate) of a bisphenol, preferably a 1:1 salt of benzyltriphenylphosphonium chloride and 4,4'-hexafluoroisopropylidene diphenol. X can also be —OAr or —OArOH anions, where Ar an is aryl group, or the mono- or di-anion of a bisphenol. Usually, about 0.2–2 parts by weight quarternary phosphonium compound per 100 units fluoroelastomer are used. Representative vulcanization accelerators are illustrated as follows: methyl trioctyl phosphonium tetrafluoroborate, tetraphenyl phosphonium bromide and chloride, benzyl tricotyl phosphonium bromide and chloride, methyl trioctyl phosphonium acetate, methyl trioctyl phosphonium dimethyl phosphate, methyl trioctyl phosphonium chloride, methoxyethoxyethyl trioctyl phosphonium chloride, tetraoctyl phosphonium bromide, butyl trioctyl phosphonium bromide, 1-carbethoxyethyl triphenyl phosphonium chloride, tetrabutyl phosphonium chloride, 2,4-dichlorobenzyl triphenyl phosphonium chloride, m-trifluoromethylbenzyl trioctyl phosphonium chloride, 2,2,3,3-tetrafluoropropyl trioctyl phosphonium chloride, 2,2,3,3,4,4,5,5-octafluoropentyl trioctyl phosphonium chloride, isobutyl triphenyl phosphonium bromide, 2-pentyl triphenyl phosphonium bromide, 4-methylbenzyl triphenyl phosphonium chloride, 4-chlorobenzyl triphenyl phosphonium chloride, diphenylmethyl triphenyl phosphonium chloride, m-trifluoromethylbenzyl triphenyl phosphonium chloride, 1-naphthylmethyl triphenyl phosphonium chloride, 2-cyanobenzyl triphenyl phosphonium bromide, 4-cyanobutyl triphenyl phosphonium bromide, alpha-carbethoxybenzyl triphenyl phosphonium bromide, carbethoxymethyl triphenyl phosphonium bromide, methoxymethyltriphenyl phosphonium chloride, allyloxymethyl triphenyl phosphonium chloride, allyl triphenyl phosphonium chloride, and tetrabutyl phosphonium chloride. Particularly preferred accelerators are benzyltriphenylphosphonium chloride and bromide, and the phenolate of 4,4'-hexafluoroisopropylidene diphenol.

The curing system used with the fluoroelastomers must contain, in addition to the quaternary phosphonium compound and tetraalkyl ammonium halide disclosed herein, certain crosslinking agents that are either bisphenols or polyhydroxy phenols described herein. It is the combination of these components that results in a vinylidene fluoride-based fluoroelastomer that when cured in contact with metal to form, for example, a shaft seal forms a strong bond with the metal surface.

The crosslinking agent used in the fluoroelastomer compositions are bisphenols usually having the formula:

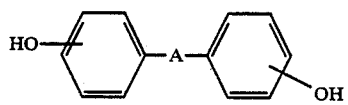

where A is a stable divalent radical such as

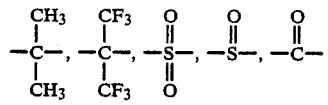

Representative bisphenols include 4,4'-hexafluoroisopropylidene diphenol, 4,4'-isopropylidene diphenol, and 4,4'-dihydroxy diphenyl sulfone. The crosslinking agent can be a polyhydroxy phenol of the formula:

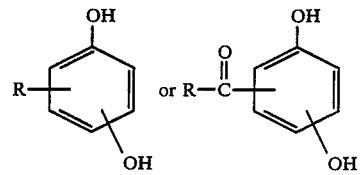

where R is H or an alkyl group having 1–4 carbon atoms or an aryl group containing 6–10 carbon atoms and R' is an alkyl group containing 1–4 carbon atoms or an aryl group containing 6–10 carbon atoms. Blends of two or more crosslinking agents can be used in the present invention.

Preferred bisphenols and polyhydroxy phenol crosslinking agents include
4,4'-hexafluoroisopropylidene diphenol;
4,4'-dihydroxydiphenyl sulfone;
4,4'-dihydroxy benzophenone,
2,4'-dihydroxybenzophenone.

The crosslinking agent can be added to the ingredients in amounts of from about 0.1–5 parts by weight per 100 parts fluoroelastomer, preferably 0.6–2.5 parts.

Finally, the fluoroelastomer composition must contain a tetralkylammonium chloride, bromide or iodide wherein each member of the alkyl group contains 1–10 carbon atoms, preferably 3–6, most preferably 4. The amount of tetralkylammonium halide that is added to the composition is from about 0.02–0.8 weight percent based on the weight of the elastomeric copolymer, preferably 0.05–0.2 weight percent. When these small amounts of tetraalkylammonium halides are present in the fluoroelastomer composition that is cured by a crosslinking system containing a quaternary phosphonium compound and a bisphenol or certain polyhydroxy phenols to form, for example, a shaft seal, the composition adheres strongly to the metal component of the shaft seal.

The fluoroelastomer compositions of this invention are made by mixing the ingredients of the composition in a high shear mixing device, such as a Banbury internal mixer or a two-roll rubber mill, to intimately mix the ingredients at elevated temperatures, e.g., 90°–100° C., for a few minutes, e.g., 2–6 minutes.

The fluoroelastomer composition of the invention can also contain a metal compound composed of a divalent metal oxide, such as magnesium oxide, zinc oxide, calcium oxide, or lead oxide, or a divalent metal hydroxide; or a mixture of the oxide and/or hydroxide with a metal salt of a weak acid, for exmaple, a mixture containing about 1–70 percent by weight of a metal salt. Among the useful metal salts of weak acids are barium-, sodium-, potassium-, lead-, and calcium-/-stearate, -benzoate, -carbonate, -oxalate, and -phosphite. The amount of the metal compound added generally is about 0.5–20 parts by weight per 100 parts of fluoroelastomer, about 2–15 parts being preferred. The metal compound concentration to some extent affects the rate of cure, and below the preferred range the cure rate may sometimes be unduly decreased. Above the preferred range, the elastic properties of a cured fluoroelastomer are gradually impaired and it is, therefore, advantageous not to use too large amounts of the metal compound.

The metal compound serves a dual purpose. It scavanges certain gaseous and acidic materials which are evolved during vulcanization and can chemically attack and weaken the fluoroelastomer. It also provides the fluoroelastomer with long term aging stability. When using a metal oxide, it can be compounded with the fluoroelastomer stock either free or as a metal oxide complex or chelate with organic complexing agents and ligands, such a cyclic polyethers, amines, phosphines, ketones, alcohols, phenols, or carboxylic acids.

The fluoroelastomer compositions can contain conventional fillers, in amounts of up to 100 parts per 100 parts fluoroelastomer, usually, about 15-50 parts per 100 parts fluoroelastomer. Representative fillers include carbon black and clays, pigments, such as titanium dioxide, processing aids such as tetramethylene sulfone, and oils and waxes that aid in the processing of the compositions.

The following examples further illustrate the invention in which all parts are by weight unless otherwise specified.

EXAMPLES

Examples 1-4

The fluoroelastomer composition of Example 1 was prepared by adding to an internal mixer (B-Banbury) 1500 grams of a terpolymer of vinylidene fluoride, hexafluoropropylene and tetrafluoroethylene (45/30/25 by weight), 450 grams MT Carbon Black, 45 grams magnesium oxide, 90 grams calcium hydroxide, 14.6 grams of the vulcanization accelerator the benzyltriphenylphosphonium phenolate or 4,4'-hexabluoroisopropylidene diphenol, 22.9 gram sof the crosslinking agent hexafluoroisoproylidenebis(4-hydroxybenzene), 15 grams carnauba wax and 0.75 grams of tetrabutylammonium bromide (0.05 weight percent based on weight of terpolymer). The compound was mixed until a chart temperature of 104° C. was reached in about 2.5 minutes. The compound was discharged from the mixer and placed on a two-roll rubber mill which was used to prepare the sheet stock.

In a similar manner, fluoroelastomer compositions of Examples 2-4 were prepared as described above except these examples contained 1.5 grams, 3.0 grams, or 7.5 grams, respectively, of tetrabutylammonium bromide (0.1, 0.2, and 0.5 weight percent, respectively, based on the weight of the terpolymer) in place of the 0.75 grams of tetrabutylammonium bromide used in Example 1.

A control experiment was conducted without the addition of the metal adhesion promoter, tetrabutylammonium bromide.

TEST FOR ADHESION 1 inch×4 inch (2.5×10.2 cm) rubber strips were died out from stock sheeted to a thickness of 0.100 inch (25 mm). The surface of 1 inch×4 inch (2.5×10.2 cm) plain carbon steel strips were roughened by sand blasting with 200 mesh alumina grit. After the metal strips were degreased, they were dipped in an organosilane primer dissolved in methanol (a 1/1 [v/v] Chemlok 607/methanol solution). The metal strips were air dried and then put in an air oven at 150° C. for 30 minutes. A rubber strip was compression molded onto a primed metal strip at 190° C. for 5 minutes. Adhesion was evaluated immediately upon removal from the press (results listed under "hot") and also at room temperature on the next day (results listed under "cold"). Adhesion wave evaluated by attempting to remove the rubber from the steel strip. An adhesion rating was given from a 1 to a 5. A rating of 1 indicates complete adhesive failure: no rubber is bonded to metal. A rating of 5 indicates a complete adhesive bond: all of the rubber is bonded to the metal. The results are shown below in Table I.

TABLE I

| Adhesion | Control | 1 | 2 | 3 | 4 |
|---|---|---|---|---|---|
| Hot | 1 | 4 | 4 | 4 | 4 |
| Cold | 1 | 5 | 5 | 5 | 5 |

EXAMPLES 5-8

The procedure described above in Example 1 was substantially repeated except that 0.75 grams (0.05 weight percent), 1.5 grams (0.1 weight percent), 3.0 grams (0.2 weight percent), and 7.5 grams (0.5 weight percent) of tetrabutylammonium iodide was used in Examples 5, 6, 7, and 8, respectively, in place of tetrabutylammonium bromide.

Samples of the fluoroelastomer compositions for adhesion testing were prepared as described above in Examples 1-4 and the test results for the fluoroelastomer compositions are given below in Table II.

TABLE II

| Adhesion | Control | 5 | 6 | 7 | 8 |
|---|---|---|---|---|---|
| Hot | 1 | 4 | 4 | 4 | 4 |
| Cold | 1 | 5 | 5 | 5 | 5 |

The following test for adhesion was used to determine the adhesiveness of the fluoroelastomer compositions of Examples 9-14.

TEST FOR ADHESION EXAMPLES (9-14)

The surface of plain carbon steel washers (inside diameter=3 ⅛ in. (7.94 cm), outside diameter-5 ½ in. (14.0 cm), and thickness=0.048 in. (0.12 cm), were roughened by sand blasting with 200 mesh alumina grit. After the metal washers were degreased, they were dipped in a 1/1 (v/v) Chemlok 607/methanol solution. The metal washers were air dried and then put in an air overn at 150° C. for 30 min. These metal washers are inserts for a single-cavity simulated shaft seal mold that is used on an injection molding machine. Each compound was injection molded in this mold at a mold temperature of 190° C. for the cure times indicated in the followint tables. Adhesion was evaluated immediately upon removal from the mold (hot). Adhesion was evaluated by attempting to remove the rubber from the steel washer. An adhesion rating was given from a 1 to a 5. A rating of 1 indicates complete adhesive failure: no rubber is bonded to the metal. A rating of 5 indicates a complete adhesive bond: all of the rubber is bonded to the metal.

EXAMPLES 9-10

The fluoroelastomer compositions described below were prepared, in each case, by adding to an internal mixer (B-Banbury) a fluoroelastomer terpolymer of vinylidene fluoride, hexafluoropropylene and tetrafluoroethylene (45/30/25 ratio by weight), carbon black, magnesium oxide, calcium hydroxide, benzyltriphenylphosphonium chloride vulcanization accelerator, 4,4'-hexafluoroisopropylidene diphenol crosslinking agent and tetrmethylenesulfone process aid in the relative amounts shown in Table III. The composition of Example 9 also contained 0.1 parts of tetrabutylammonium bromide per hundred parts fluoroelastomer and the composition of Example 10 contained 0.2 parts of tetrabutylammonium bromide per hundred parts fluoroelastomer. The compounds were mixed until a chart temperature of 104° C. was reached, in about 2.5 minutes, and were then discharged from the mixer and placed on a two-roll rubber mill which was used to prepare sheet stocks. A control sample was prepared which contained no added tetraalkyl ammonium halide.

Metal adhesion was evaluated by the method described above, and the results are shown in Table III. The samples containing tetrabutylammonium bromide had very strong adhesion to metal, whereas the control sample was only weakly bonded to the metal.

TABLE III

| EXAMPLE | 9 | 10 | CONTROL |
|---|---|---|---|
| Composition | | | |
| Fluoroelastomer | 100 | 100 | 100 |
| MT (N-990) carbon black | 25 | 25 | 25 |
| Magnesium oxide | 3 | 3 | 3 |
| Calcium hydroxide | 6 | 6 | 6 |
| Benzyltriphenylphosphonium chloride | 0.54 | 0.54 | 0.54 |
| 4,4'-Hexafluoroisopropylidene diphenol | 1.6 | 1.6 | 1.6 |
| Tetrabutylammonium bromide | 0.1 | 0.2 | — |
| Tetramethylene sulfone | 0.53 | 0.53 | 0.53 |
| Cure Rate By Oscillating Disk Rheometer ASTM D-2084; 177° C., 3 deg. arc | | | |
| Minimum torque, Nm | 1.8 | 1.8 | 1.8 |
| ts 0.2, min. | 2.8 | 2.3 | 3.2 |
| t50, min. | 3.9 | 3.8 | 5.4 |
| t90, min. | 4.7 | 4.6 | 6.4 |
| Maximum torque, Nm | 10.1 | 10.5 | 9.5 |
| Properties | | | |
| Press cure at 190° C. for 5 min. Post cure at 200° C. for 24 hr. | | | |
| Hardness, Durometer A (ASTM D-2240) | 73 | 74 | 73 |
| Stress Strain Properties (ASTM D-412) | | | |
| 100% Modulus, MPa | 3.3 | 3.3 | 3.3 |
| Tensile Strength, MPa | 9.7 | 10.0 | 9.8 |
| Elongation at Break, % | 310 | 310 | 325 |
| Metal Adhesion | | | |
| Cure time (seconds) | 45 | 35 | 45 |
| Adhesion strength (hot) | 5 | 5 | 2 |

EXAMPLES 11-14

The fluoroelastomer compositions described below were prepared by mixing the fluoroelastomer described in Example 9 with MT carbon black, magnesium oxide and calcium hydroxide, in the same proportions as in Example 9 but with 0.8 parts by weight per 100 parts fluoroelastomer of the vulcanization accelerator, the benzyltriphenylphosphonium phenolate of 4,4'-hexafluoroisopropylidene diphenol, 1.2 parts of the crosslinking agent, 4,4'-hexafluoroisopropylidene diphenol and 0.5 parts of Carnauba wax. These samples also contained mixed therein tetrabutylammonium chloride and tetrabutylammonium bromide in the quantites shown in Table IV. A control composition was also prepared having the same ingredients as in Examples 11-14 except that it did not contain the tetraalkylammonium chloride or bromide. After molding and testing by the procedures described above, only the fluoroelastomer compositions containing tetrabutylammonium chloride or bromide showed improved metal adhesion.

TABLE IV

| EXAMPLE | 11 | 12 | 13 | 14 | CONTROL |
|---|---|---|---|---|---|
| tetrabutylammonium chloride | 0.1 | 0.2 | — | — | — |
| tetrabutylammonium bromide | — | — | 0.1 | 0.2 | — |
| Metal Adhesion | | | | | |
| Cure time (seconds) | 60 | 60 | 60 | 60 | 60 |
| Adhesion strength (hot) | 3 | 3 | 3 | 5 | 1 |

We claim:

1. A process for making a curable fluoroelastomer composition that has enhanced adhesion to metal when cured which comprises:

mixing an elastomeric copolymer of vinylide fluoride and at least one other fluorinated monomer with a vulcanization accelerator that is a quaternary phosphonium compound, a crosslinking agent selected from the group consisting of a bisphenol and a polyhydroxy phenol of the formula

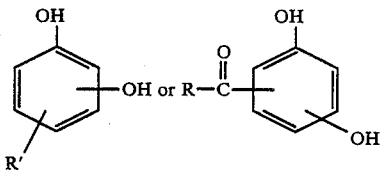

where R is H or an alkyl group or an aryl group, and R' is an alkyl group or an aryl group, and adding 0.02–0.8 weight percent based on the weight of the elastomeric copolymer of vinylidene fluoride of a metal adhesion promoter that is a tetraalkylammonium halide wherein each alkyl group contains 1–10 carbon atoms and the halide is a chloride, bromide or iodide.

2. A process of claim 1 wherein the tetraalkylammonium halide is tetrabutylammonium iodide.

3. A process of claim 1 wherein the tetraalkylammonium halide is tetrabutylammonium bromide.

4. A process of claim 1 wherein the tetraalkylammonium halide is tetrabutylammonium chloride.

5. A process of claim 1 wherein the amount of tetraalkylammonium halide added is from 0.05 –0.2 weight percent.

6. A process of claim 1 wherein the crosslinking agent is 4,4'-hexafluoroisopropylidene diphenol.

7. A process of claim 1 wherein the quaternary phosphonium vulcanization accelerator is benzyltriphenylphosphonium chloride.

8. A process of claim 1 wherein the quaternary phosphonium vulcanization accelerator is a 1:1 phosphonium salt of a bisphenol 9. A process of claim 6 wherein the quaternary phosphonium vulcanization accelerator is a 1:1 salt of benzyltriphenolphosphonium chloride and 4,4'-hexafluoroisopropylidene diphenol.

* * * * *

UNITED STATES PATENT OFFICE
CERTIFICATE OF CORRECTION

PATENT NO. : 4,925,892

DATED : May 15, 1990

INVENTOR(S) : David L. Tabb and Janet M. Wilson

It is certified that error appears in the above-identified patent and that said Letters Patent is hereby corrected as shown below:

Column 8, claim 9, "claim 6" should read -- claim 1 --.

Signed and Sealed this

Twenty-third Day of July, 1991

Attest:

HARRY F. MANBECK, JR.

*Attesting Officer*  *Commissioner of Patents and Trademarks*